(No Model.)
F. B. SANDERS.
BICYCLE ALARM.
No. 596,127. Patented Dec. 28, 1897.
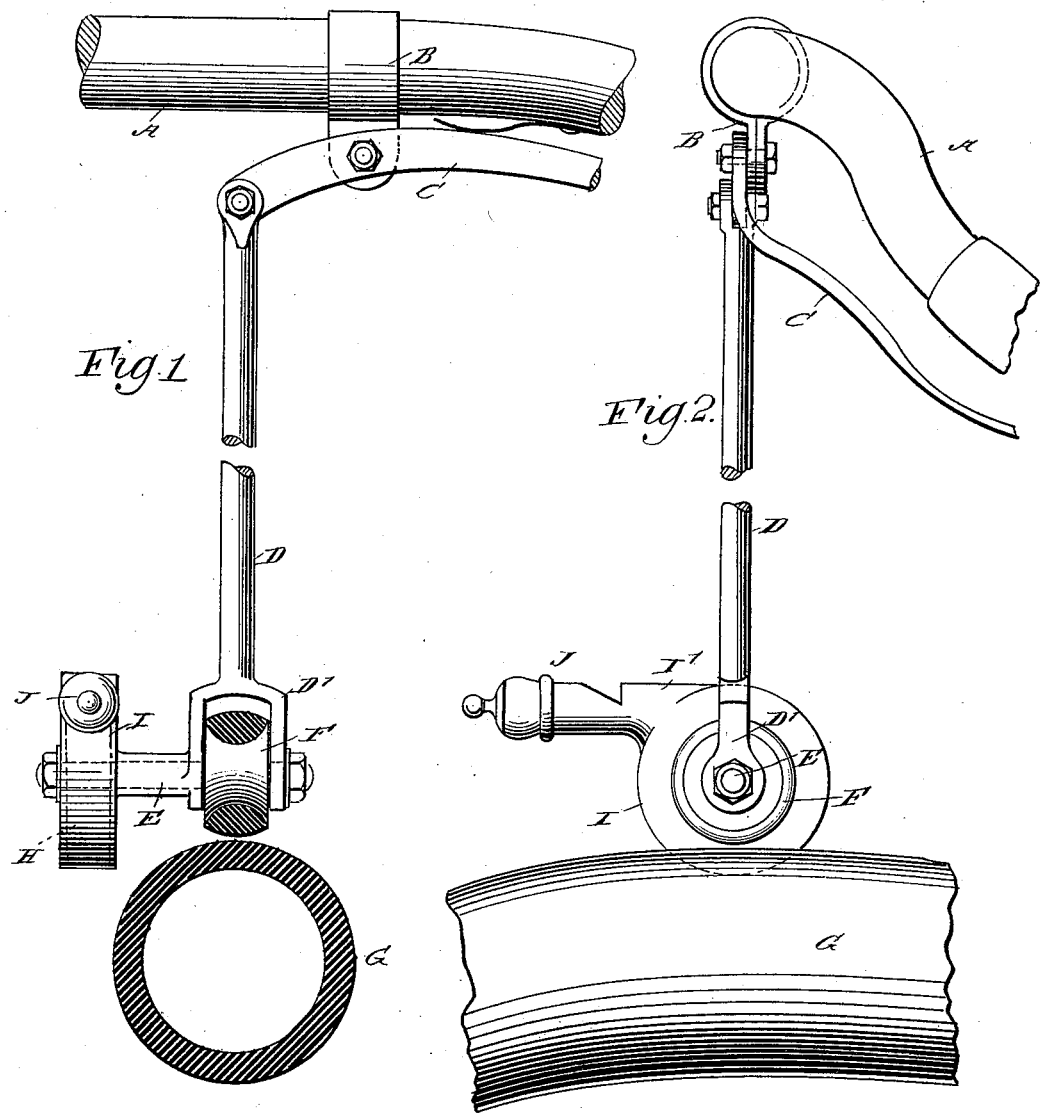
WITNESSES:
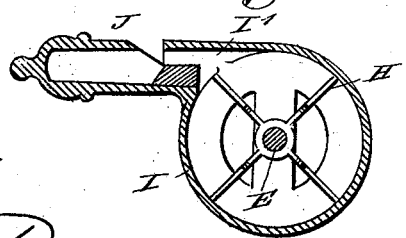
INVENTOR
F. B. Sanders
BY
ATTORNEYS.
THE NORRIS PETERS CO., PHOTO-LITHO., WASHINGTON, D. C.

UNITED STATES PATENT OFFICE.

FRED BURTON SANDERS, OF NORTH BEND, PENNSYLVANIA.

BICYCLE-ALARM.

SPECIFICATION forming part of Letters Patent No. 596,127, dated December 28, 1897.

Application filed January 8, 1895. Renewed November 24, 1897. Serial No. 660,289. (No model.)

*To all whom it may concern:*

Be it known that I, FRED BURTON SANDERS, of North Bend, in the county of Clinton and State of Pennsylvania, have invented a new and Improved Bicycle-Alarm, of which the following is a full, clear, and exact description.

The object of the invention is to provide a new and improved alarm for bicycles and other vehicles and which is simple and durable in construction and completely under the control of the operator.

The invention consists of certain parts and details and combinations of the same, as will be fully described hereinafter and then pointed out in the claims.

Reference is to be had to the accompnying drawings, forming a part of this specification, in which similar letters of reference indicate corresponding parts in all the figures.

Figure 1 is a transverse section of the improvement as applied. Fig. 2 is a side elevation of the same, and Fig. 3 is a sectional side elevation of the blower and whistle.

On the handle-bar or other part A of the vehicle on which the improvement is applied is secured a clip B, on which is pivoted a spring-pressed lever C under the control of the rider. The lever C supports at one end a downwardly-extending rod D, formed at its lower end with a fork D', in which is journaled a shaft E, carrying a friction-wheel F, made of rubber or other suitable material and adapted to be pressed in contact with the tire G of the vehicle. Thus when the operator presses the lever C the rod moves downward to move the friction-wheel F in frictional contact with the tire, so that when the vehicle moves forward and the wheel is rotated then the tire G rotates the friction-wheel F.

On the shaft E are secured the wings H of a blower, provided with a casing I, supported from one of the arms of the fork D', as is plainly indicated in Fig. 1. In the discharge I' of the blower-casing I is arranged a whistle J, projecting tangentially from the casing, so that when the wings of the blower are set in motion then air is drawn through the side of the casing to the interior thereof and discharged under pressure through the outlet I' and whistle J, so that the latter is sounded to give an alarm. The bore J' of the whistle extends in alinement with the discharge I' and is closed at its outer end, the outlet $J^2$ of the whistle being located laterally, as shown.

Normally the lever C is in such a position that the friction-wheel H is out of contact with the tire G; but when the lever is pressed on, as previously explained, and the friction-wheel F is rotated then the shaft E is likewise revolved and the blower-wings H are set in motion to sound the alarm. As soon as the operator releases the pressure on the lever C the latter returns to its normal position and draws the rod D upward, so as to move the friction-wheel out of contact with the tire of the wheel, and the alarm then ceases.

It will be seen that this device is very simple in construction and is completely under the control of the operator, so that a loud alarm can be sounded whenever desired.

Having thus fully described my invention, I claim as new and desire to secure by Letters Patent—

1. A bicycle-alarm, comprising an operating-lever, a rod freely suspended from the said operating-lever, and unrestrained by any other connection so as to be capable of bodily moving upward and downward, a friction-wheel journaled in said rod, and a sounding device actuated by the revolution of the friction-wheel, substantially as described.

2. A bicycle-alarm, comprising an operating-lever fulcrumed on the handle-bar to swing up and down relatively thereto, a rod freely suspended from the said operating-lever, and unrestrained by any other connection so as to be capable of bodily moving upward and downward, a friction-wheel journaled in the lower end of the rod, and adapted to engage the wheel-tire, and a sounding device actuated by the revolution of the friction-wheel, substantially as described.

FRED BURTON SANDERS.

Witnesses:
J. F. REILLEY,
LIN WELCH.